US006705623B2

(12) United States Patent
Nadeau et al.

(10) Patent No.: US 6,705,623 B2
(45) Date of Patent: Mar. 16, 2004

(54) MODULAR PLASTIC SHOPPING CART

(75) Inventors: Serge Nadeau, Montréal (CA); Jean-Christophe Doyon, Verdun (CA)

(73) Assignee: Les Industries Rondi Inc., Montreal (CA)

( * ) Notice: Subject to any disclaimer, the term of this patent is extended or adjusted under 35 U.S.C. 154(b) by 166 days.

(21) Appl. No.: 10/032,497

(22) Filed: Dec. 26, 2001

(65) Prior Publication Data

US 2003/0116933 A1 Jun. 26, 2003

(51) Int. Cl.[7] .............................................. B62D 39/00
(52) U.S. Cl. .............................. 280/33.991; 280/33.993
(58) Field of Search .............................. 280/33.991, 2, 280/33.993, 4, 33.995–8, 47.26, 47.17, 47.34, 651

(56) References Cited

U.S. PATENT DOCUMENTS

| 4,046,394 A | | 9/1977 | Thompson, Jr. | ......... 280/33.99 |
| 4,953,878 A | * | 9/1990 | Sbragia | ....................... 280/30 |
| 5,441,288 A | * | 8/1995 | Rehrig | .................. 280/33.991 |
| 5,613,696 A | | 3/1997 | de Luna | ................. 280/33.992 |
| 5,671,933 A | * | 9/1997 | Tucker | .................... 280/47.19 |
| 5,915,704 A | | 6/1999 | deLuna | .................. 280/33.991 |
| 6,155,580 A | * | 12/2000 | Symons | .................. 280/33.991 |
| 6,497,423 B1 | * | 12/2002 | Perelli et al. | ............ 280/47.34 |
| 2002/0135144 A1 | * | 9/2002 | Murar et al. | ........... 280/33.991 |

FOREIGN PATENT DOCUMENTS

| WO | WO 95/03201 | 2/1995 |
| WO | WO 96/04161 | 2/1996 |
| WO | WP 97/30880 | 8/1997 |
| WO | 02/074606 A1 * | 9/2002 | ............ 280/33.991 |

* cited by examiner

Primary Examiner—Brian L. Johnson
Assistant Examiner—Gerald B. Klebe
(74) Attorney, Agent, or Firm—St. Onge Steward Johnston & Reens LLC

(57) ABSTRACT

The modular plastic shopping cart comprises a wheeled base comprising two opposite vertical side sections each having at least one horizontally projecting member providing a support surface; two side uprights removably connectable to the wheeled base, predetermined cooperating shapes of the wheeled base and the side uprights preventing, when assembled, relative pivoting and sliding movement between the side uprights and the wheeled base; a basket removably connectable to the side uprights, predetermined cooperating shapes of the side uprights and the basket preventing, when assembled, relative pivoting and sliding movement between the basket and the side uprights; first securing device for securing the side uprights to the wheeled base; and second securing device for securing the basket to the side uprights.

18 Claims, 23 Drawing Sheets

MODULAR PLASTIC SHOPPING CART

FIELD OF THE INVENTION

The present invention relates to a modular plastic shopping cart such as, for example, shopping carts used in supermarkets.

BACKGROUND OF THE INVENTION

Known in the art, there is the international application published under publication no. WO 95/03201 naming Franck DESHOURS et al. as inventors, in which is described a trolley made of synthetic material. The trolley made of synthetic material comprises two sidewalls, each defining a side panel extended by a tab for receiving a handling bar, and a leg segment. The trolley is formed of the side panels, a front panel, a rear panel and a base. The leg is formed of segments of a junction plate. The trolley includes basket assembling means consisting of a set of alternate lugs and notches.

Also known in the art, there is the international application published under publication no. WO 96/04161 naming as inventor Leon Keith ERNST, in which is described a shopping trolley construction and identification system. The trolley is constructed from essentially planar plastic moulded components, for storage and transport in a dismantled condition. The trolley basket is formed from side panels, bottom panel, front panel, rear panel with integrally moulded child's seat and a handle, while the base is formed by side rails and a front joining plate.

Also known in the art, there is the U.S. Pat. No. 4,046,394 naming William A. THOMPSON JR. as the inventor, in which is described a shopping cart. The shopping cart has a basket mounted on a wheeled base. The basket comprises a main body member, which is moulded in one piece from a plastic material. A one-piece gate moulded of plastic material is hingedly mounted on the body member and comprises the rear wall of the basket. The base is also formed by a one-piece frame which is moulded from plastic material, which frame has wheels mounted thereon for rolling engagement with a support surface. The frame and body member has a cooperating tongue-and-groove connection for fixedly mounting the basket onto the base.

Also known in the art, there is the U.S. Pat. No. 5,915,704, naming as inventor Gerardo Segura DE LUNA, in which is described a supermarket shopping cart. The cart is a single piece plastic body supermarket cart having a load basket and a base in which support wheels are mounted. A back plate having side wings in combination with grooves located in the side walls serve as stops. The base is provided with a rear extension, where the rear wheels of the cart are mounted. Each wheel is attached by being fastened in a hole in the base.

Also known in the art, there is the U.S. Pat. No. 5,613,696 naming as inventor Gerardo S. DE LUNA, in which is described a shopping trolley for supermarkets and the like. The shopping trolley has a basket mounted on a support structure and a user handle. The support structure is mounted on a wheeled carriage. The basket is openable at its rear to permit nesting of similar trolleys, and the rear opening is closed by a swinging flap, which is made of a single plastic moulding incorporating the basket, the support structure and the wheeled carriage.

Also known in the art, there is the international application published under international publication no. WO 97/30880 naming as inventor Michelangelo BERGIA, in which is described a supermarket trolley. The supermarket trolley comprises a base with castor wheels provided with a support from which a basket container is overhanging. The base with the support is formed by a single moulded plastic material, and the basket container is formed of a distinct body of moulded plastic material. The basket container and the support of the base are mutually connected in a quickly releasable way through lower snap-fit pins and an upper tie rod coaxial with a tubular handle.

An object of the present invention is to provide a plastic shopping cart that is modular so that when a portion thereof is damaged, it can be repaired by replacing only the damaged portion, and that at the same time can support a load that is superior to what can be supported by plastic shopping carts of the prior art.

SUMMARY OF THE INVENTION

According to the present invention, there is provided a modular plastic shopping cart, comprising a wheeled base comprising two opposite vertical side sections each having at least one horizontally projecting member providing a support surface; two side uprights connectable to the wheeled base, each of the side uprights comprising lower and upper vertical sections, each of the lower vertical sections having at least one horizontally projecting member providing a resting surface, each of the upper vertical sections having at least one horizontally projecting member providing a support surface, the support surfaces of the wheeled base and the resting surfaces of the side uprights having predetermined cooperating shapes to prevent, when assembled, relative pivoting and sliding movement between the side uprights with and the wheeled base; a basket connectable to the side uprights, the basket comprising two opposite vertical side sections each having at least one horizontally projecting member providing a resting surface, the support surfaces of the side uprights and the resting surfaces of the basket having predetermined cooperating shapes to prevent, when assembled, relative pivoting and sliding movement between the basket and the side uprights; first securing means for securing the side uprights to the wheeled base; and second securing means for securing the basket to the side uprights.

The objects, advantages and other features of the present invention will become more apparent upon reading up the following non-restrictive description of the preferred embodiments thereof, given for the purpose of exemplification only with reference to the accompanying drawings.

DESCRIPTION OF PREFERRED EMBODIMENTS

Figure 1:
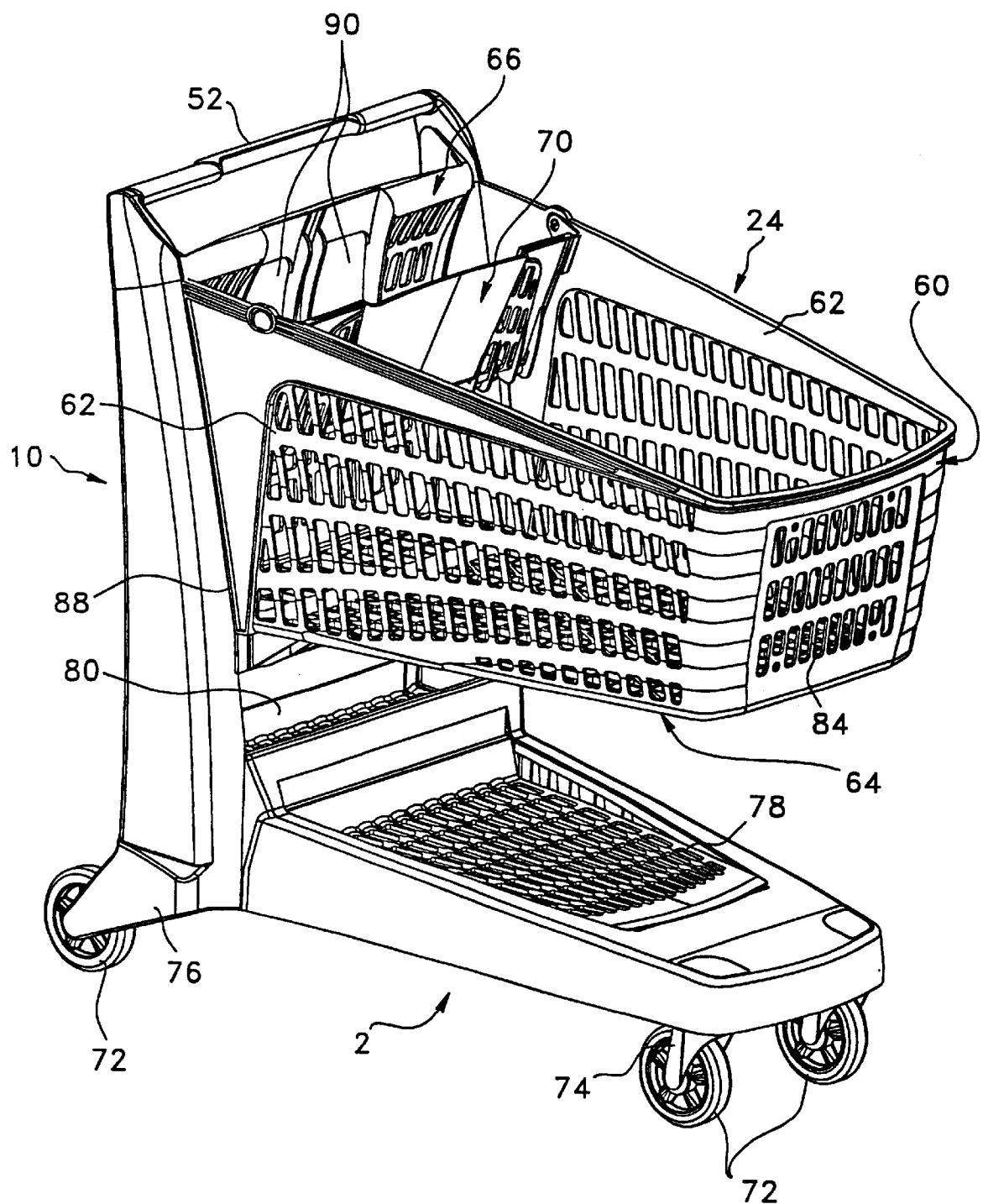
FIG. 1 is a side and front perspective view of a first preferred embodiment of a modular plastic shopping cart according to the present invention.
Figure 2:
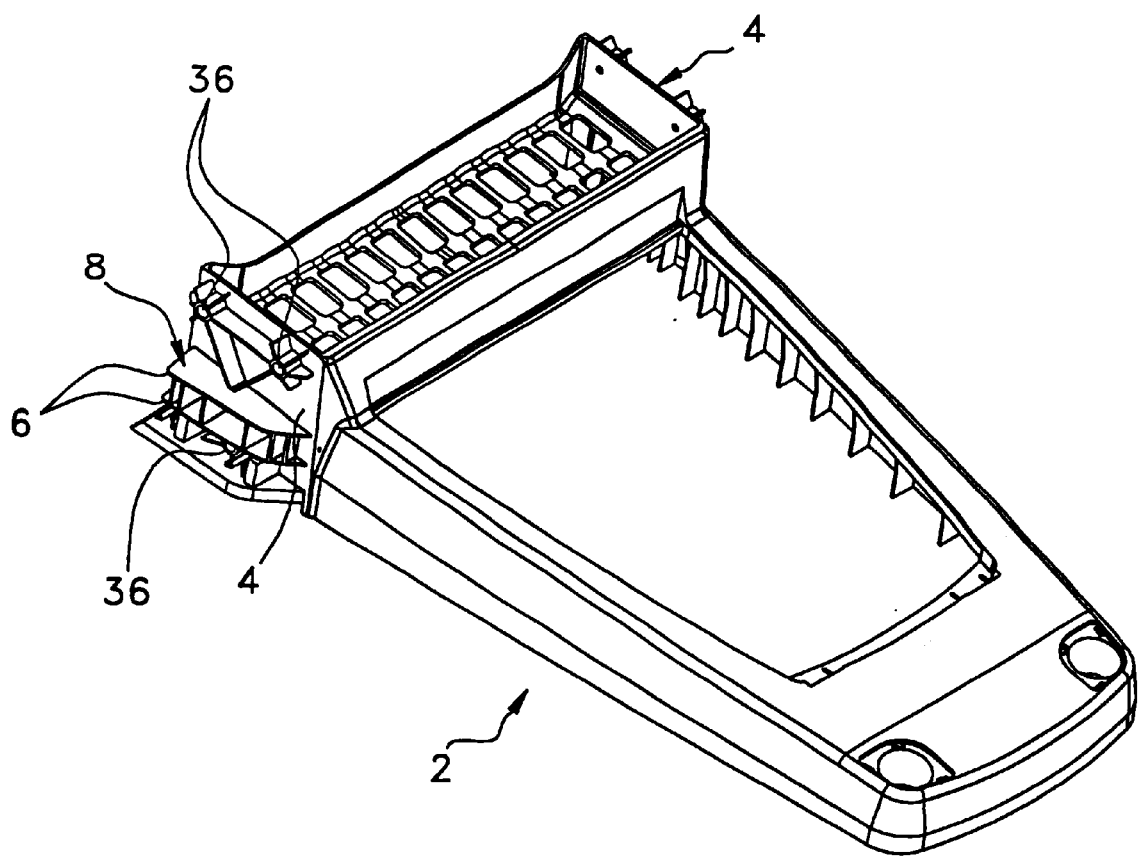
FIG. 2 is a top and side perspective view of a one of the components shown in FIG. 1.

In the following description, the same numeral references refer to similar elements. The embodiments shown in the figures are preferred. Also, in order to lighten the figures, some elements are not referred to in some figures if they were already identified in a precedent figure.

Referring to FIGS. 1 to 7, there is shown a first preferred embodiment of the present invention. Referring now more specifically to FIGS. 1 to 4, the modular plastic shopping cart comprises a wheeled base 2, two side uprights 10, a basket 24, a collapsible baby-seat assembly 70, and a handle 52. The wheeled base 2 comprises two opposite vertical side sections 4. Each side section has at least one horizontally projecting member 6 providing a support surface 8.

The two side uprights 10 are removably connectable to the wheeled base 2. Each side upright 10 comprises lower and upper vertical sections 12 and 14. Each lower vertical section 12 has at least one horizontally projecting member 16 providing a resting surface 18. Each upper vertical section 14 has at least one horizontally projecting member 20 providing a support surface 22. The support surfaces 8 of the wheeled base 2 and the resting surfaces 18 of the side uprights 10 have predetermined cooperating shapes to prevent, when assembled, relative pivoting and sliding movement between the side uprights 10 and the wheeled base 2.

The basket 24 is removably connectable to the side uprights 10. The basket 24 comprises two opposite vertical side sections each having at least one horizontally projecting member 28, providing a resting surface 30. The support surfaces 22 of the side uprights 10 and the resting surfaces 30 of the basket 24 have predetermined cooperating shapes to prevent, when assembled, relative pivoting and sliding movement between the basket 24 and the side uprights 10.

The shopping cart is also provided with securing means for securing the side uprights to the wheeled base 2, and securing means for securing the basket 24 to the side uprights 10. These securing means can be embodied within the predetermined cooperating shapes of the wheeled base 2, the side uprights 10 and the basket 24 for securing all the parts of the cart together. However, according to a preferred embodiment, it is also possible that the securing means for securing the side uprights 10 to the wheeled base 2, comprise threaded holes 34 moulded in a lower portion of each side uprights 10, and openings 36 moulded in a rear portion of the wheeled base 2 so that the side uprights 10 to can be secured to the wheeled base 2 by means of screws (not shown). In a similar manner, also according to a preferred embodiment, the securing means for securing the basket 24 to the side uprights 10 can comprise threaded holes 40 moulded in an upper portion of each side uprights 10, and openings 42 moulded in a rear portion of the basket 24 so that the basket can be secured to the side uprights 10 by means of screws (not shown).

Preferably, the support surfaces 22 of the side uprights 10 and the resting surfaces 30 of the basket 24 form upper and lower groups of interconnectable surfaces. Preferably, the predetermined cooperating shapes of the support surfaces 22 and of the resting surfaces 30 are shaped like angular bands. Preferably, as shown in FIGS. 3 and 4, the predetermined cooperating shapes of the resting surfaces 18 and of the support surfaces 8 are shaped like straight bands extending in parallel and along an axis parallel to a rear-front axis of the cart.

The mechanical stress resulting from a heavy load in the basket 24 is distributed over the support and resting surfaces 8, 18, 82 and 30 so that the basket can support a load superior to what is expected with shopping carts of the prior art.

Figure 3:
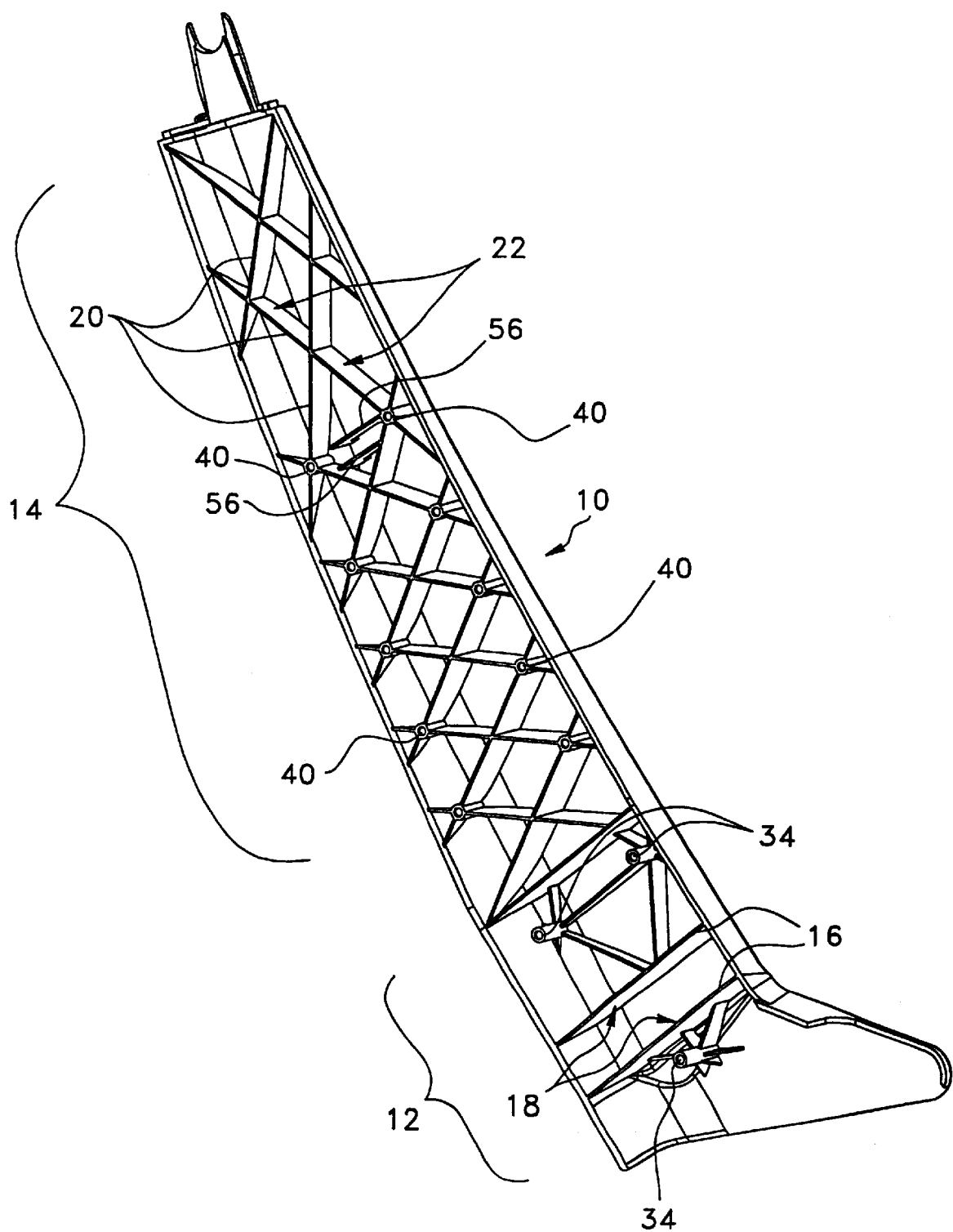
FIG. 3 is a side perspective view of one of the components shown in FIG. 1.
Figure 4:
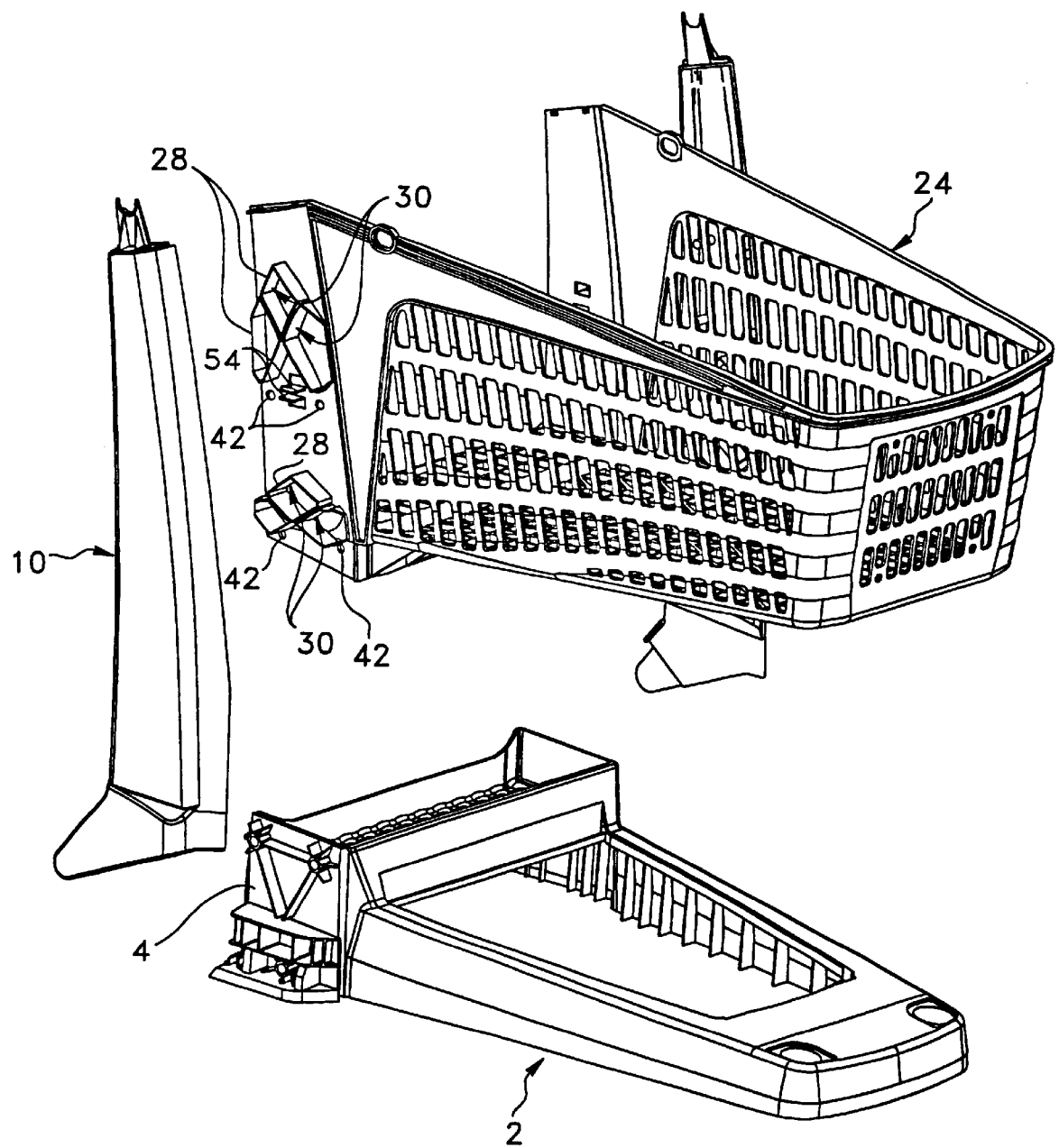
FIG. 4 is a partial side and front perspective exploded view of the embodiment shown in FIGS. 1 to 3.

Referring now more specifically to FIGS. 3 and 4, preferably, the upper vertical section of each side uprights 10 comprises two horizontally projecting elements 56 each provided with a recess. Each of the vertical side sections of the basket 24 comprises two horizontally projecting hook elements 54 for removable connection with the elements 56 of the side uprights. The horizontally projecting elements 54 and 56 are substantially flat and parallel. These elements 54 and 56 are used for securing the side uprights 10 to the basket 24.

Figure 5:
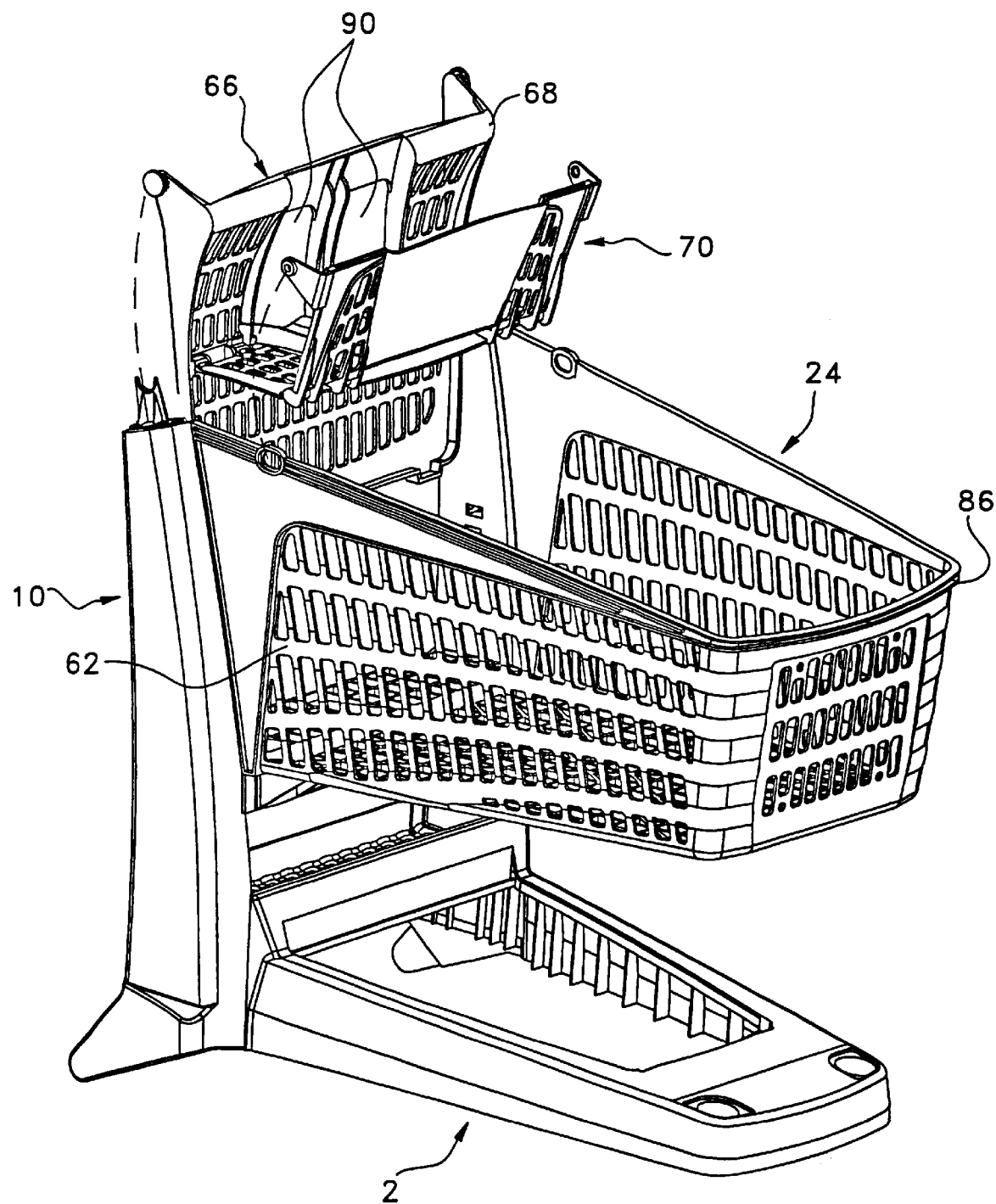
FIG. 5 is another partial side and front perspective exploded view of the embodiment shown in FIGS. 1 to 4.

Referring to FIGS. 1 and 5, the basket 24 is preferably made of one single plastic piece. The basket 24 is supported on its rear side by the side uprights 10 which are made of moulded plastic. Same size baskets can be nested into one another so as to reduce the storing volume of a column of baskets in a grocery store. For this reason, the basket 24 includes a front wall 60, two side walls 62, a bottom wall 64 and a rear wall which consists of a swinging rear wall 66 pivotable at an upper edge 68 thereof. The collapsible baby-seat assembly 70 is used as a support for a child or as an extra compartment for groceries or the like, according to particular needs, is also provided. The assembly 70 may be fixed or removable from the cart.

The frame of the shopping cart comprises a base 2 mounted on wheels 72, two side uprights 10 as well as a handle 52 that forms a relatively rigid frame at the back of the basket 24. The frame of the cart can be dismantled in order to enable the replacement of eventually defective or broken parts. The cart could advantageously be assembled by using different component sizes following different applications or different basket sizes. Thus, the side uprights 10 can solely be used with a narrower or longer base in order to accommodate different basket volumes or even two small baskets at the same time for particular applications.

The base 2 is provided with pivoting casters 74 at the front and fixed casters 76 at the back in order to facilitate the orientation and the displacements of the basket 24. It incorporates an horizontal lower support 78 for placing the more voluminous objects as well as a smaller basket 80, moulded integrally to the base 2 which is accessible from the back and which acts as a structural element between the two side uprights 10.

The great versatility of the system enables also the frame to be used without its basket 24 in order to create different types of carts for different applications such as the transportation of baggage in airports or by incorporating a pivoting shelf to transport cases in the warehouse stores.

Different handle widths can be provided for each base width. The handle 52 is preferably of ergonomic form and comprises a flat surface which could advantageously be used as a publicity support. This surface may or may not be covered with a transparent plastic component in order to protect the advertising zone. The latter also enables the insertion of a printed sheet, a sticker or the direct printing on the plastic of an advertising message, logos, a warning sign or any other message. The handle 52 can be equipped with a support for a shopping list, a calculator or a glass. This support can either be integrally moulded to the handle or it can be mechanically attached thereto as an optional part.

Although not illustrated, existing baskets can optionally be provided with a latch system which links the baskets in the parks in order to prevent theft. There exist, for the basket, two possibilities of integration of a latch system. One is the installation of an existing system attached mechanically to the flat surface of the handle. A second is the integration of such system inside one of the two studs of a system. In the latter case, the casing of the latch system needs to be replaced by an external cover when the system is not in place.

All the components of the shopping cart are preferably made by a process of injection of thermoplastic resins such as polyethylene, polypropylene, polyamide or any other appropriate resin. The basket size is preferably achieved with a single part by a process of injection of thermoplastic resin.

Still referring to FIGS. 1 and 5, the basket 24 is provided with a swinging rear wall 66 at the rear, making the nesting of the baskets 24 possible. The basket 24 is made of side walls 62 slightly bent and perforated according to an outline similar to the other component of the product. These openings contribute to make the basket 24 more transparent and reduce the quantity of raw material and consequently its weight. Round and longitudinal lumps 84 ensure the protection of the surface against scratching. The upper part of the basket 24 is preferably surrounded with a reinforcement band 86 ribbed on the outer side and which enables, by hot printing process or by screen process printing, to affix the logo of an eventual client. A vertical rib 88 runs along each rear side of the basket 24. These ribs 88 lie on the front of the uprights 10 in order to provide to the whole structure an adequate transfer and support zone of the load of the basket 24 towards the structure of the cart.

The swinging rear wall 66 may be available in two versions: with or without leg holes 90. Obviously, the one illustrated is the one with such leg holes 90.

Figure 6:
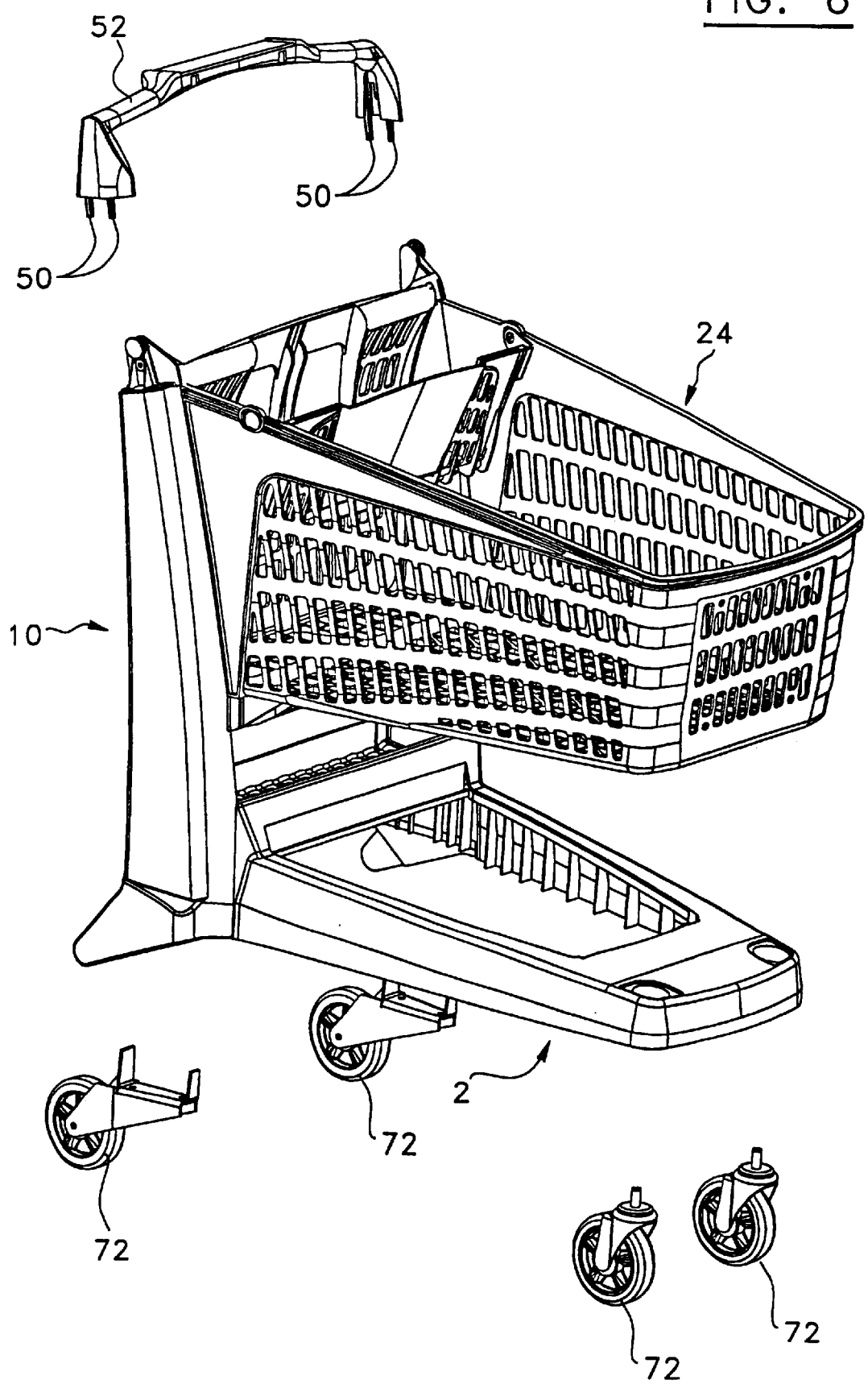
FIG. 6 is a side and front perspective exploded view of the embodiment shown in FIGS. 1 to 5.
Figure 7:
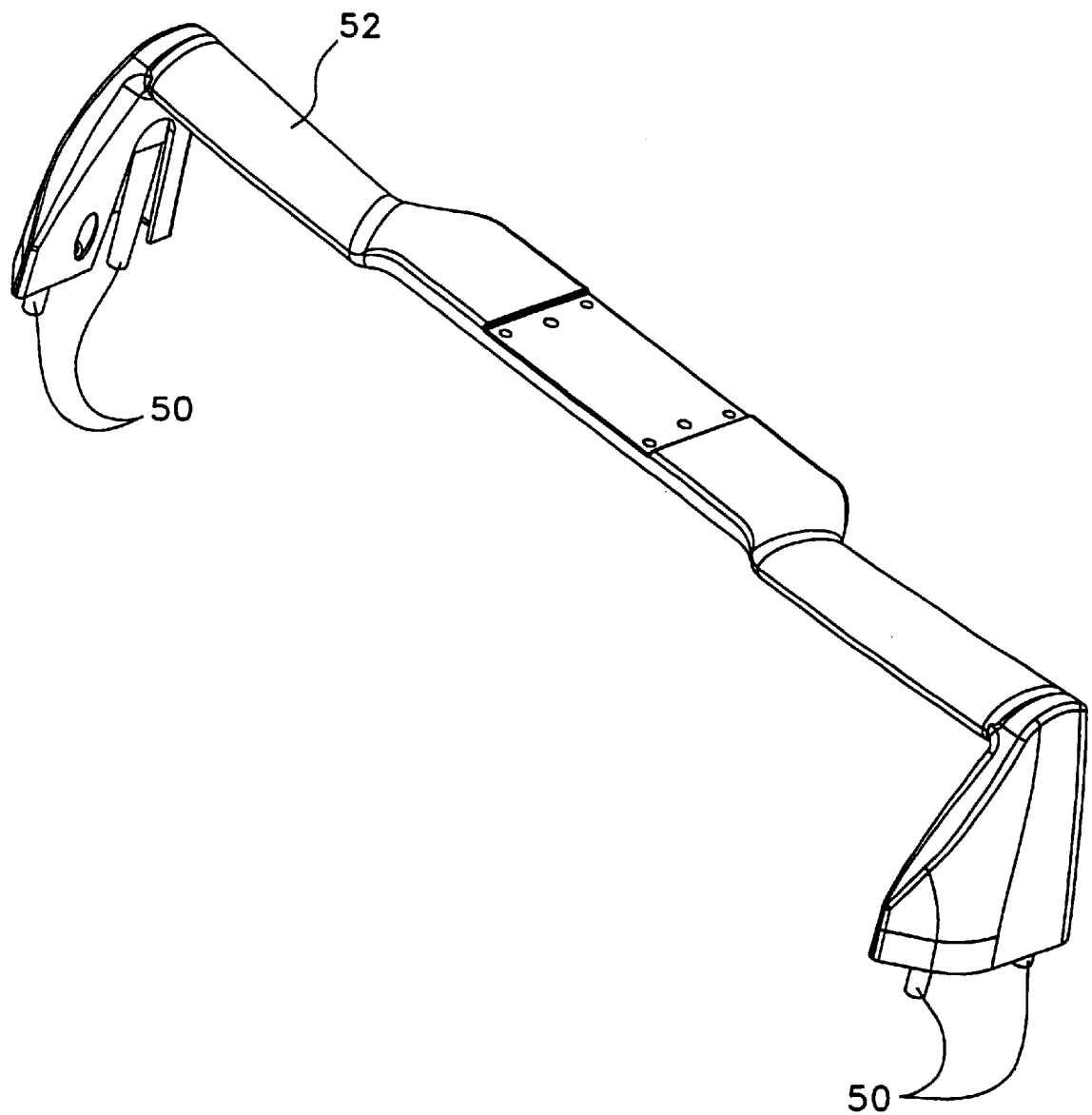
FIG. 7 is a top perspective view of one of the components shown in FIG. 6.

Referring now to FIGS. 6 and 7, each side upright 10 comprises an upper end having a flat portion provided with two holes. The removable handle 52 has an elongated body terminated by two opposite ends each provided with two parallel prongs 50 extending perpendicularly to the body. The prongs 50 have predetermined dimensions for removable connections with the holes provided in the upper ends of the side uprights 10. The wheels 72 are removably connected to the base 2.

Figure 8:
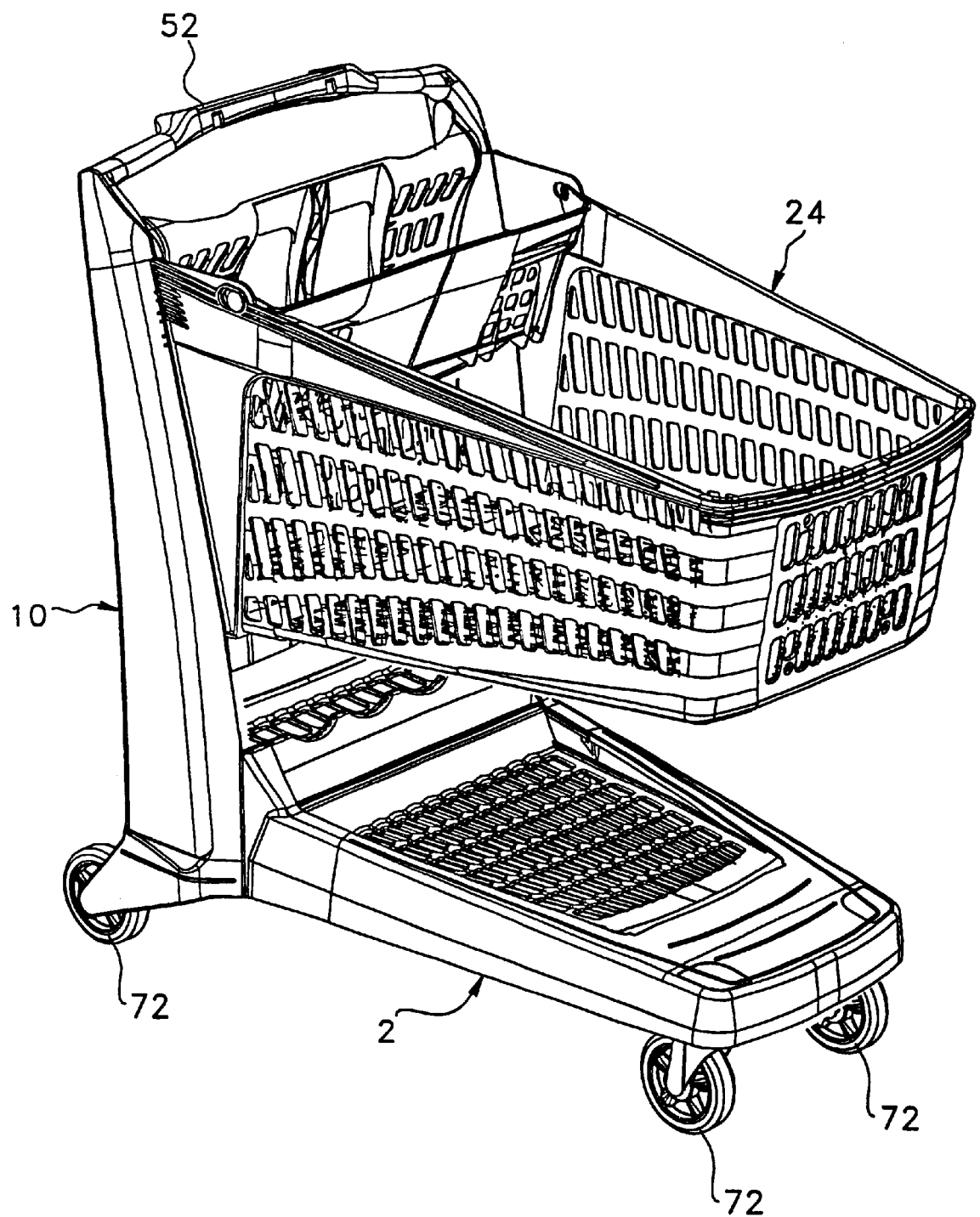
FIG. 8 is a side and front perspective view of a second preferred embodiment of a modular plastic shopping cart according to the present invention.
Figure 9:
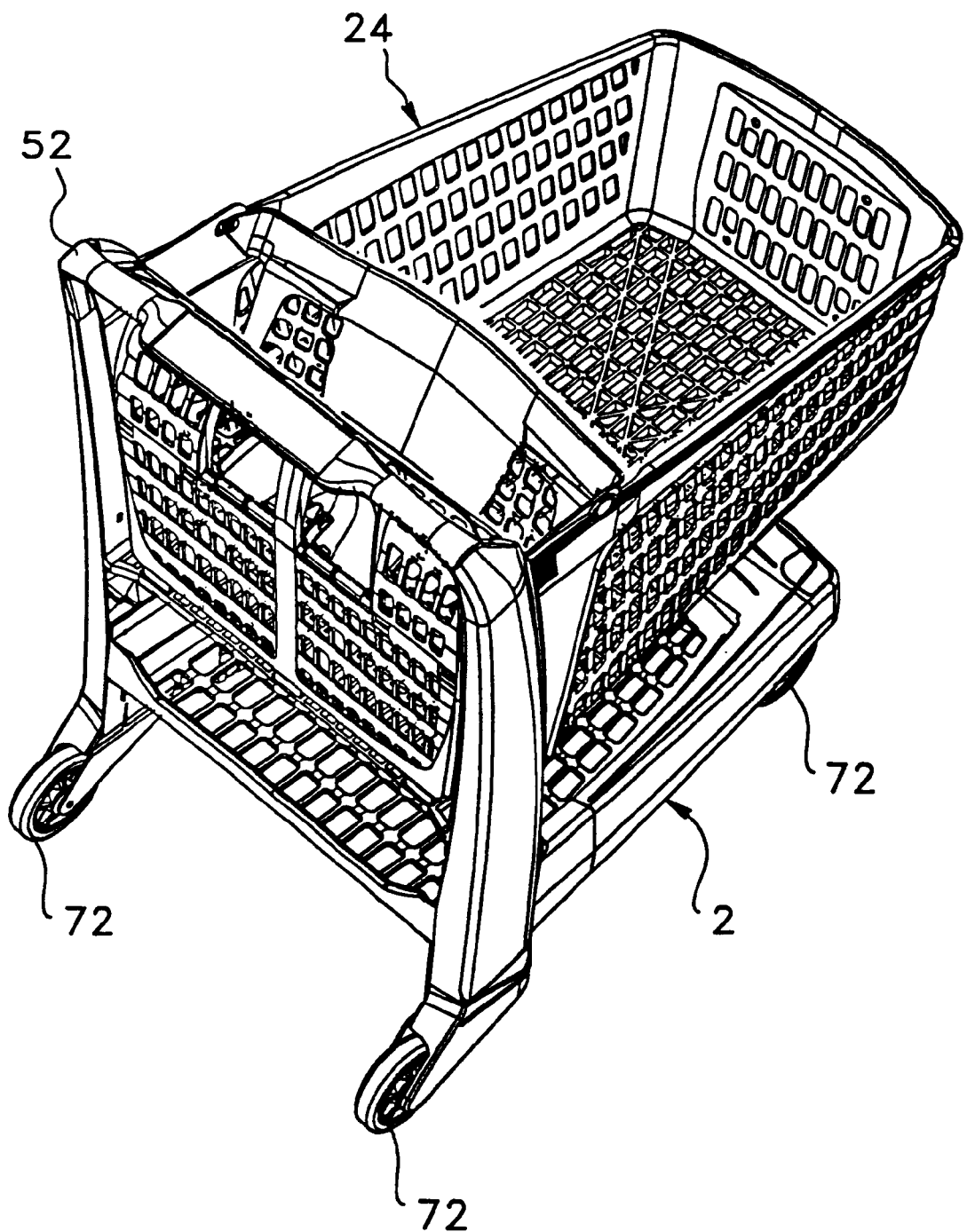
FIG. 9 is a back and top perspective view of the modular plastic shopping cart shown in FIG. 8.

Referring to FIGS. 8 to 29, there is shown a second preferred embodiment of the present invention. In order to lighten the figures, some elements are not referred to in FIGS. 8 to 29 if they were already identified in FIGS. 1 to 7. Referring now more specifically to FIGS. 8 and 9, there are shown two different views of the shopping cart which show on the one hand, the general appearance of the shopping cart, and on the other hand, some details thereof. As for the first embodiment, the shopping cart comprises a wheeled base 2, two side uprights 10, a basket 24, a collapsible baby-seat assembly 70 and a handle 52, all of these components being removably connectable.

Figure 10:
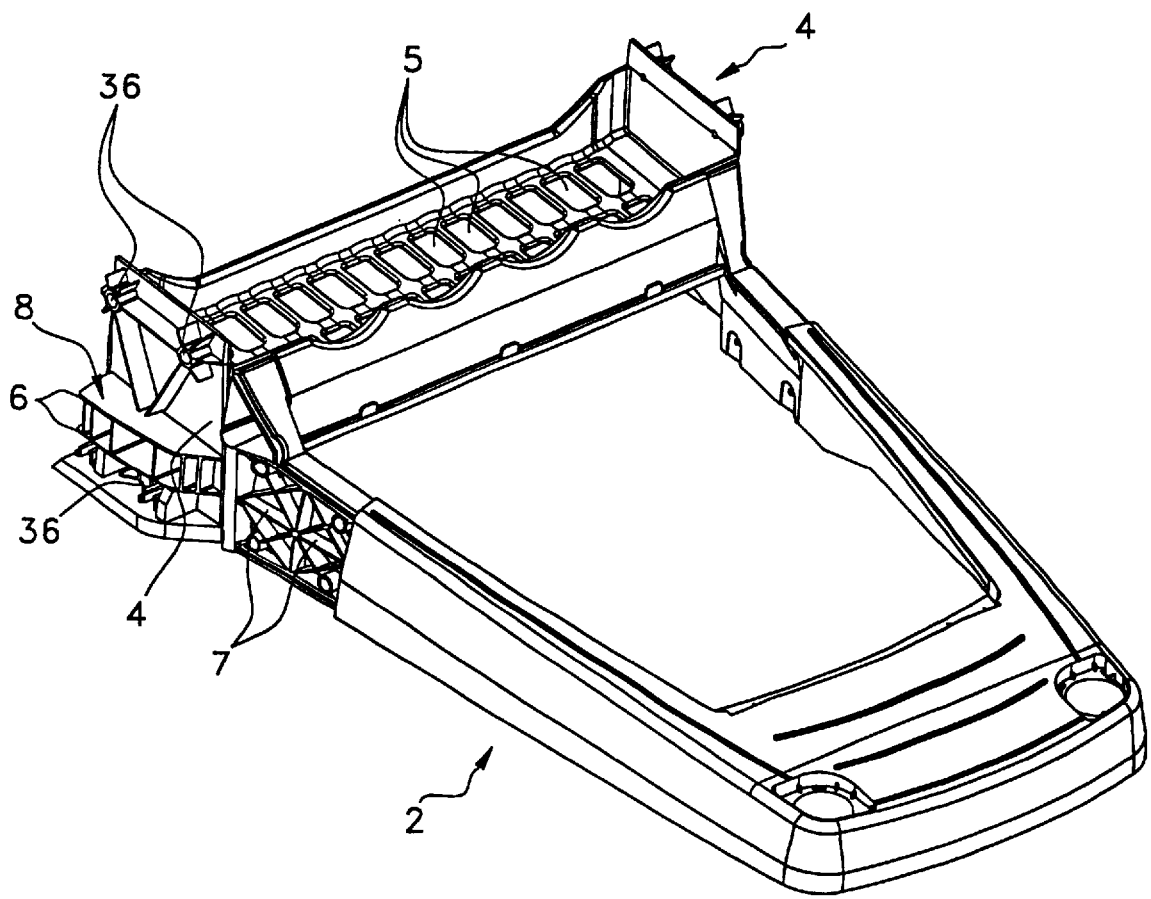
FIG. 10 is a top and side perspective view of one of the components shown in FIGS. 8 and 9.
Figure 11:
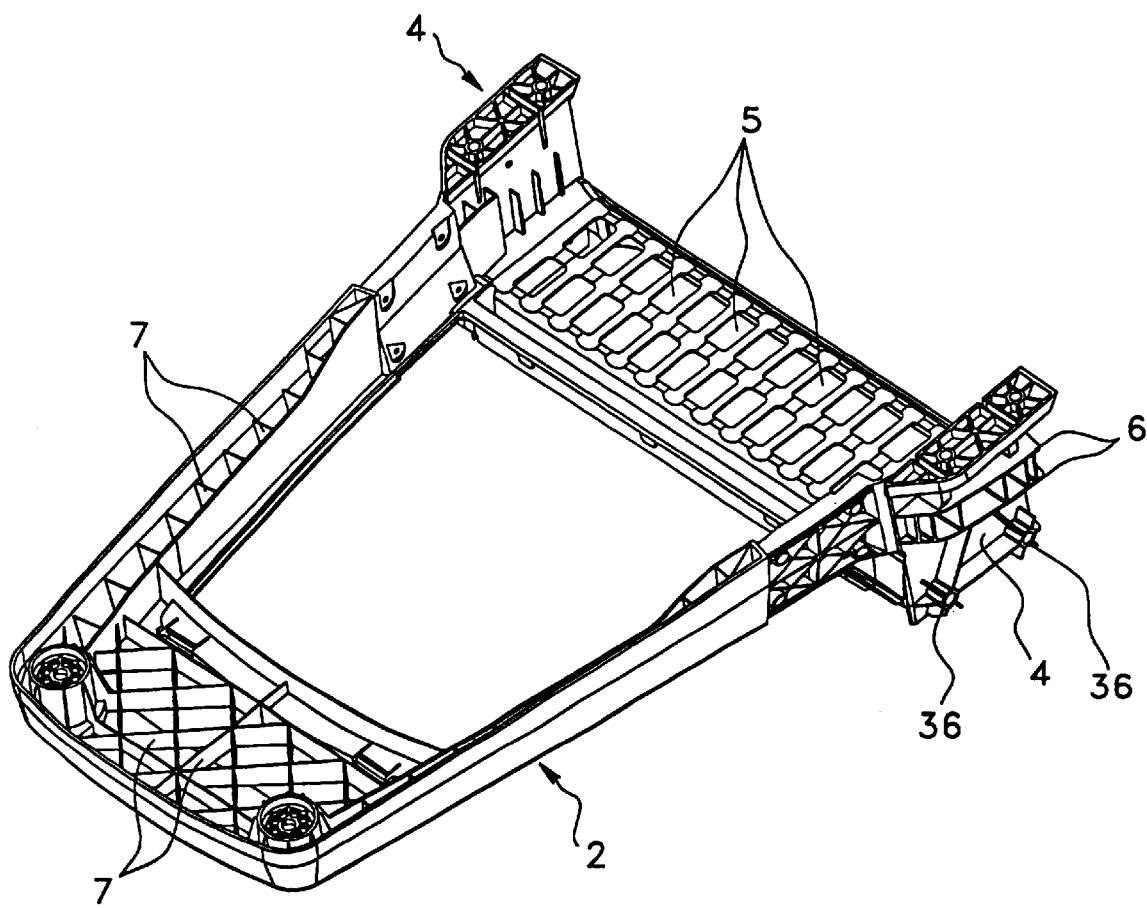
FIG. 11 is a bottom and side perspective view of the component shown in FIG. 10.

Referring now to FIGS. 10 and 11, there is shown the base 2 from two different views thereof, which show several construction details. Some parts which do not have to support great mechanical strength are provided with holes 5 whereas some other parts which have to support greater mechanical strength are provided with transversal sections 7.

Figure 12:
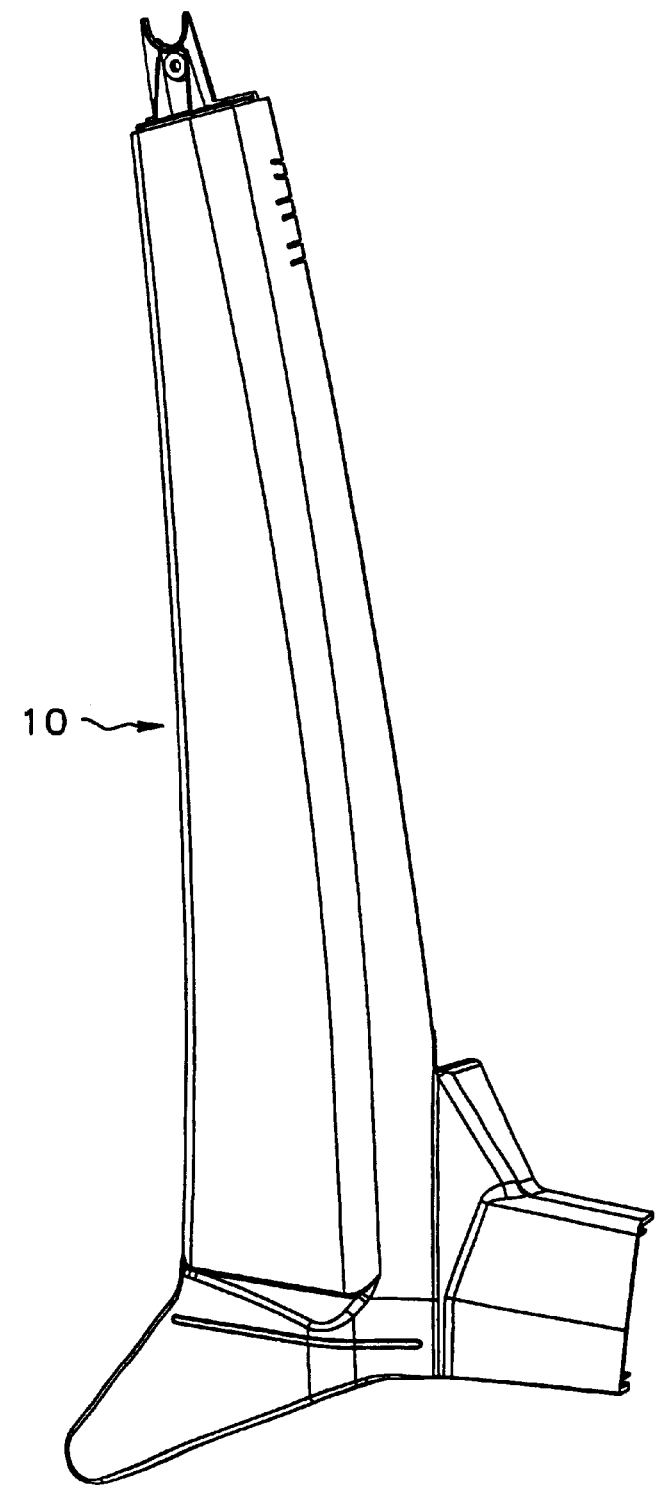
FIG. 12 is an external side view of a component shown in FIGS. 8 and 9.
Figure 13:
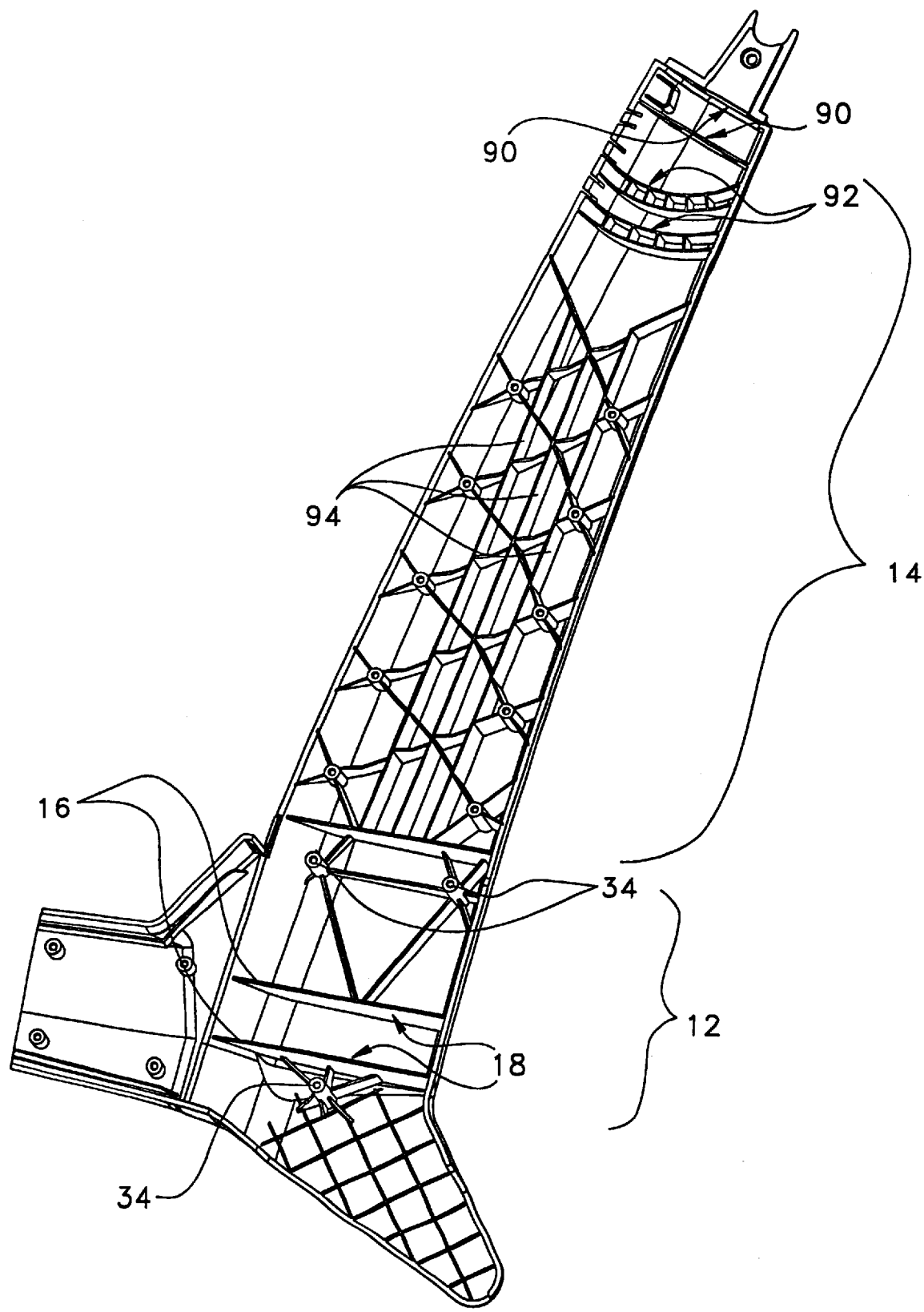
FIG. 13 is an internal side view of the component shown in FIG. 12.
Figure 14:
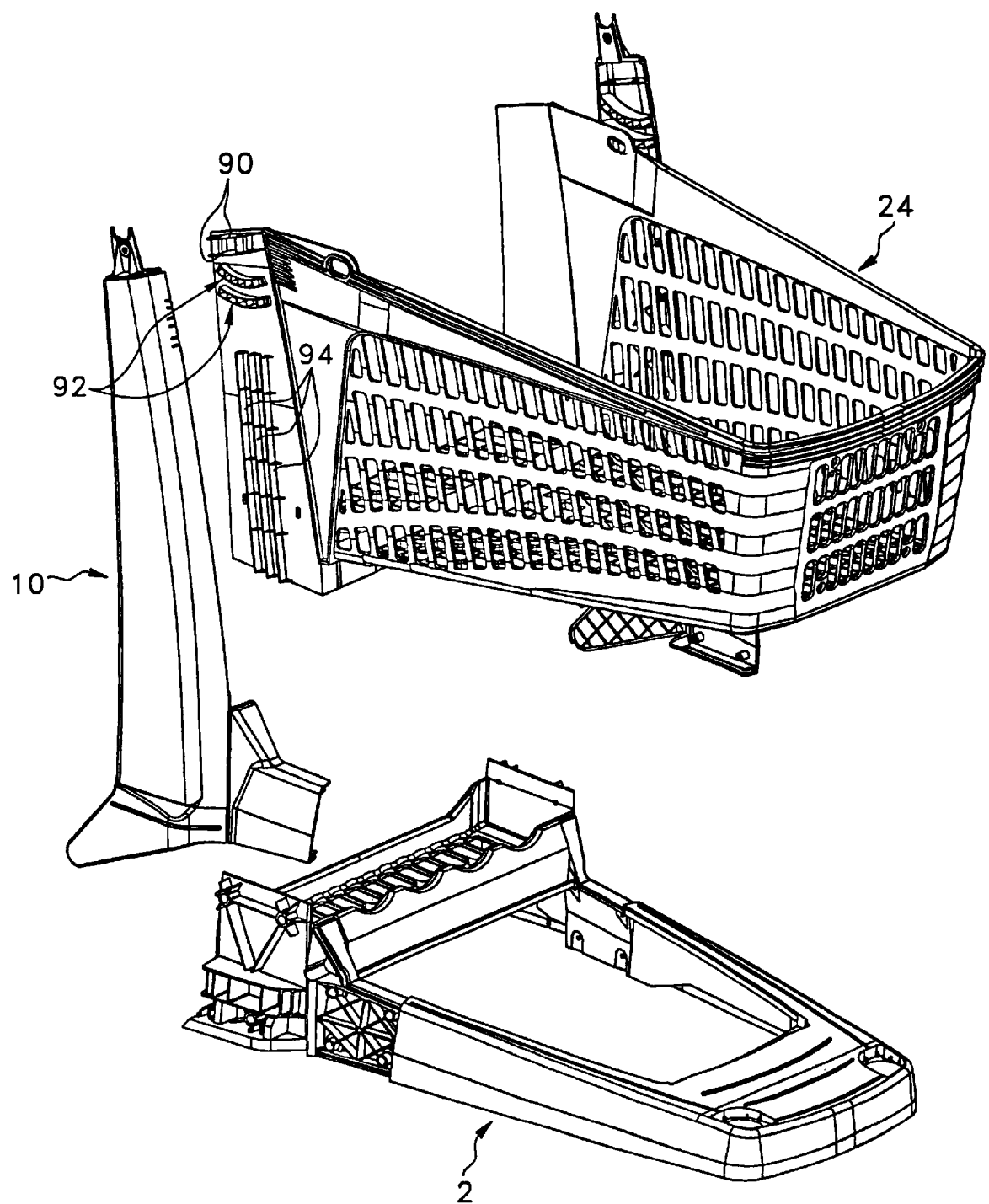
FIG. 14 is a partial side and front perspective exploded view of the shopping cart shown in FIGS. 8 to 13.

Referring now to FIGS. 12, 13 and 14, there are shown details of the side uprights 10, the basket 24 and the base 2. The connecting elements between the side uprights 10 and the base 2 are similar to those of the first embodiment. However, the connecting elements between the side uprights 10 and the basket 24 are different from those of the first embodiment. The interconnectable surfaces of the side uprights and of the basket 24 form upper and lower groups of interconnectable surfaces. The interconnectable surfaces of the upper group comprise upper interconnectable surfaces 90 that are shaped like straight bands extending in parallel and along an upward slope extending from rear to front of the cart, and lower interconnectable surfaces 92 that are shaped like curved bands extending in parallel and generally along an axis parallel to a rear-front axis of the cart. The interconnectable surfaces 94 of the lower group are shaped like straight bands extending generally along a vertical direction.

Figure 15:
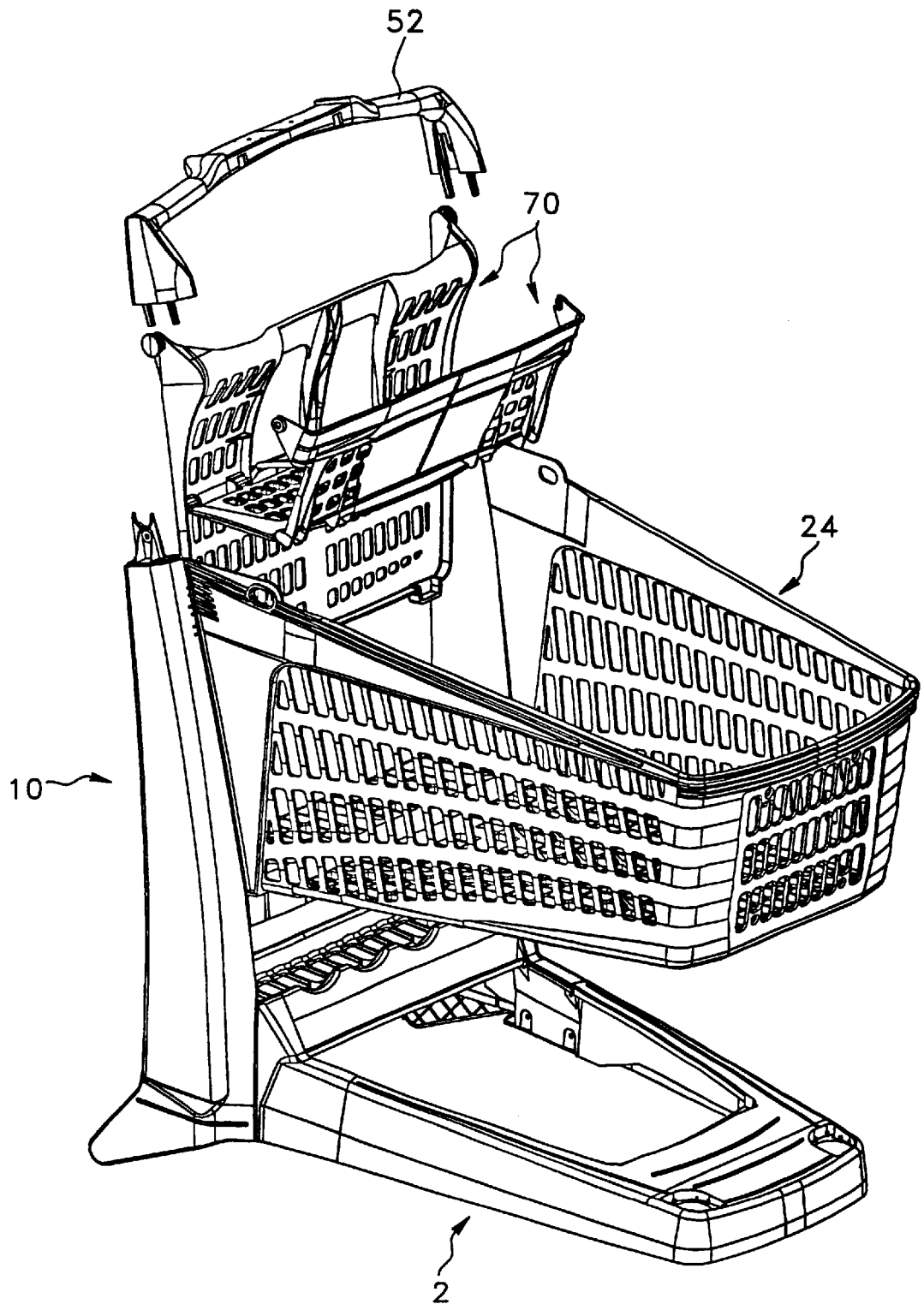
FIG. 15 is another partial side and front perspective exploded view of the shopping cart shown in FIGS. 8 to 14.

Referring now to FIG. 15, there is shown a partial exploded perspective view which illustrates details of the collapsible baby-seat assembly 70.

Figure 16:
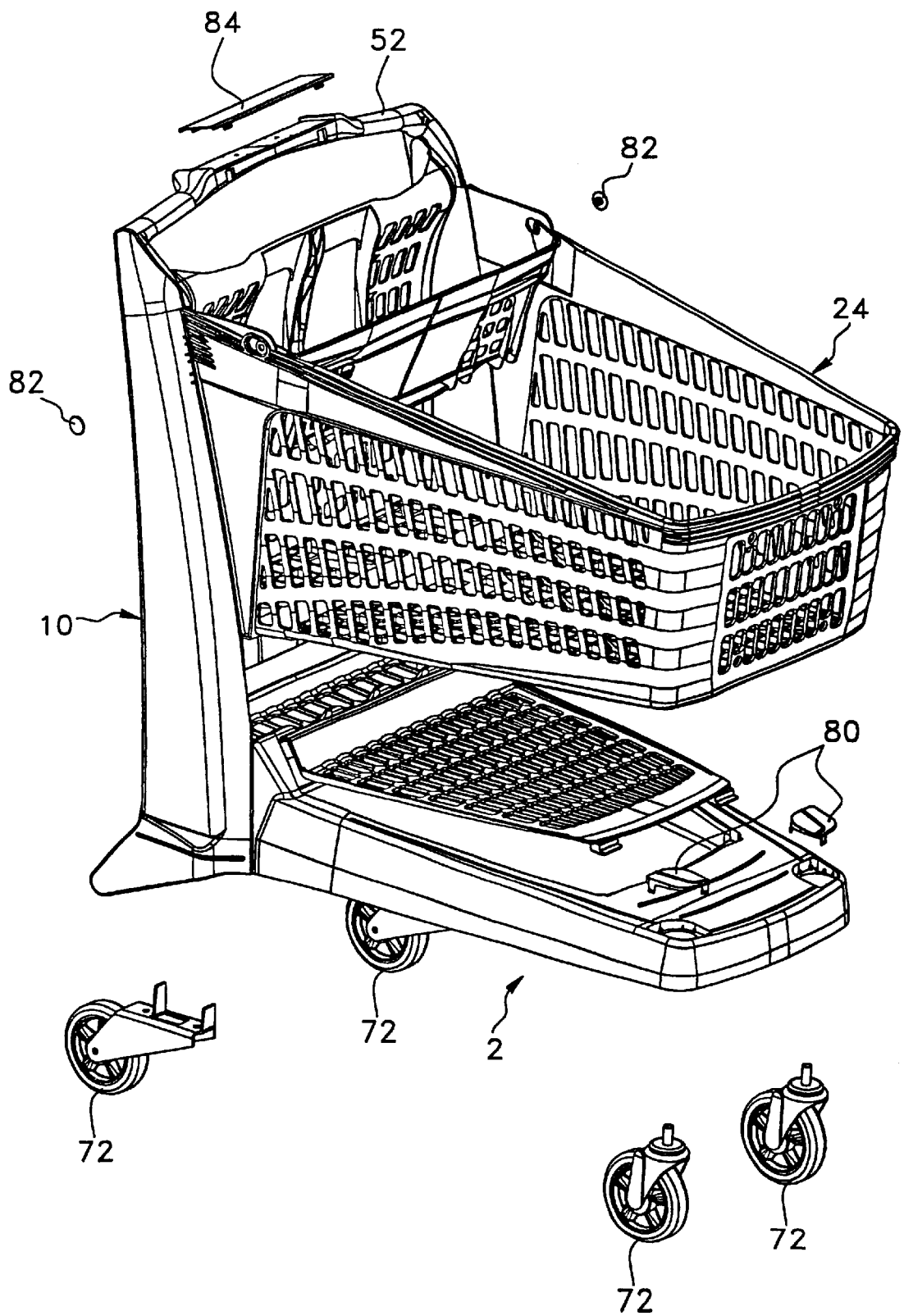
FIG. 16 is a side and front perspective exploded view of the shopping cart shown in FIGS. 8 to 15.
Figure 17:
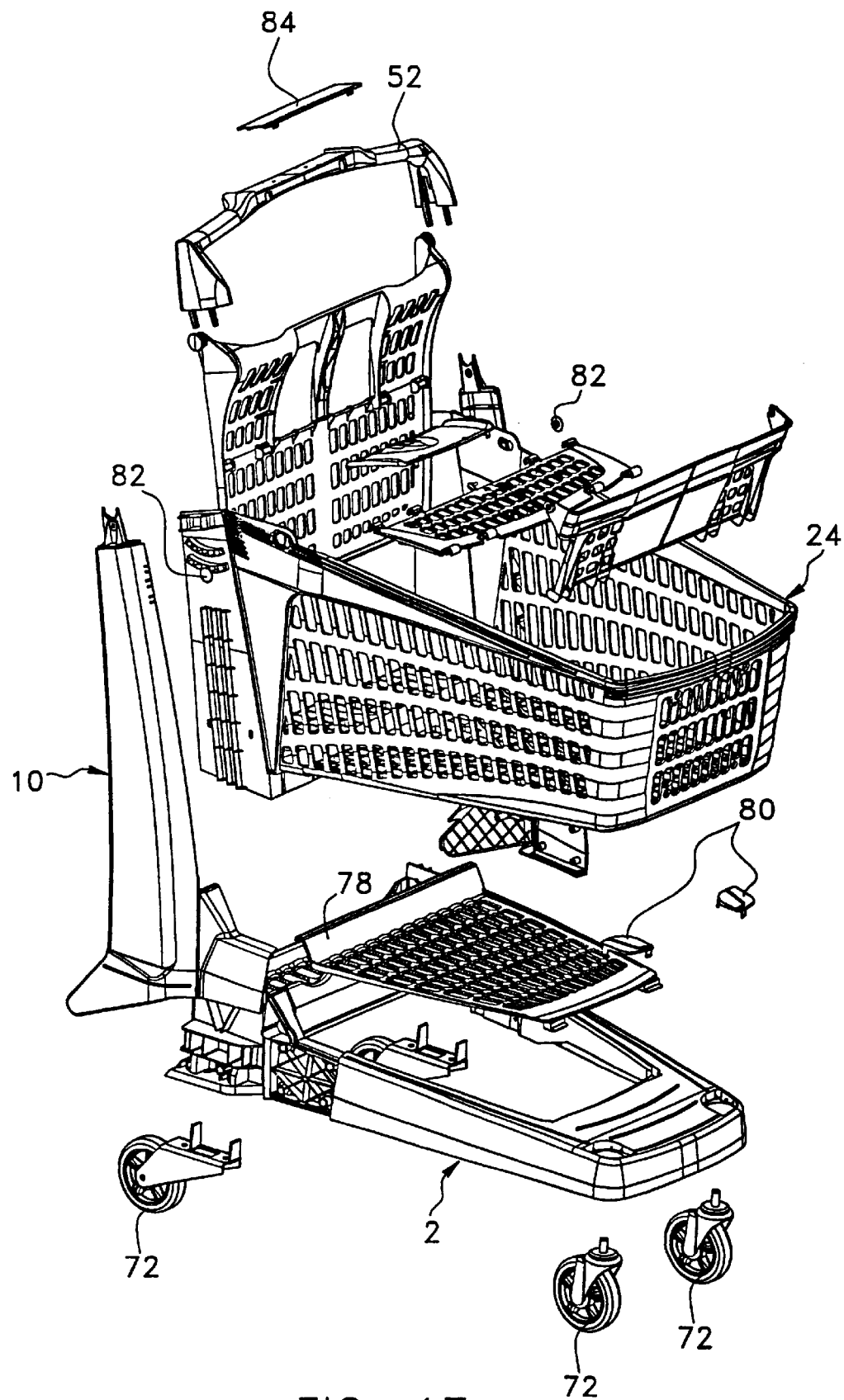
FIG. 17 is another side and front perspective exploded view of the shopping cart shown in FIGS. 8 to 16.

Referring now to FIGS. 16 and 17, there are shown two different perspective exploded views of the shopping cart which show more explicitly the modular aspect of the shopping cart. Some elements shown in these figures, such as buttons 80 and 82, a transparent plate 84, the handle 52, and the basket 24 will be shown with more details in the remaining FIGS. 18 to 29.

Figure 18:
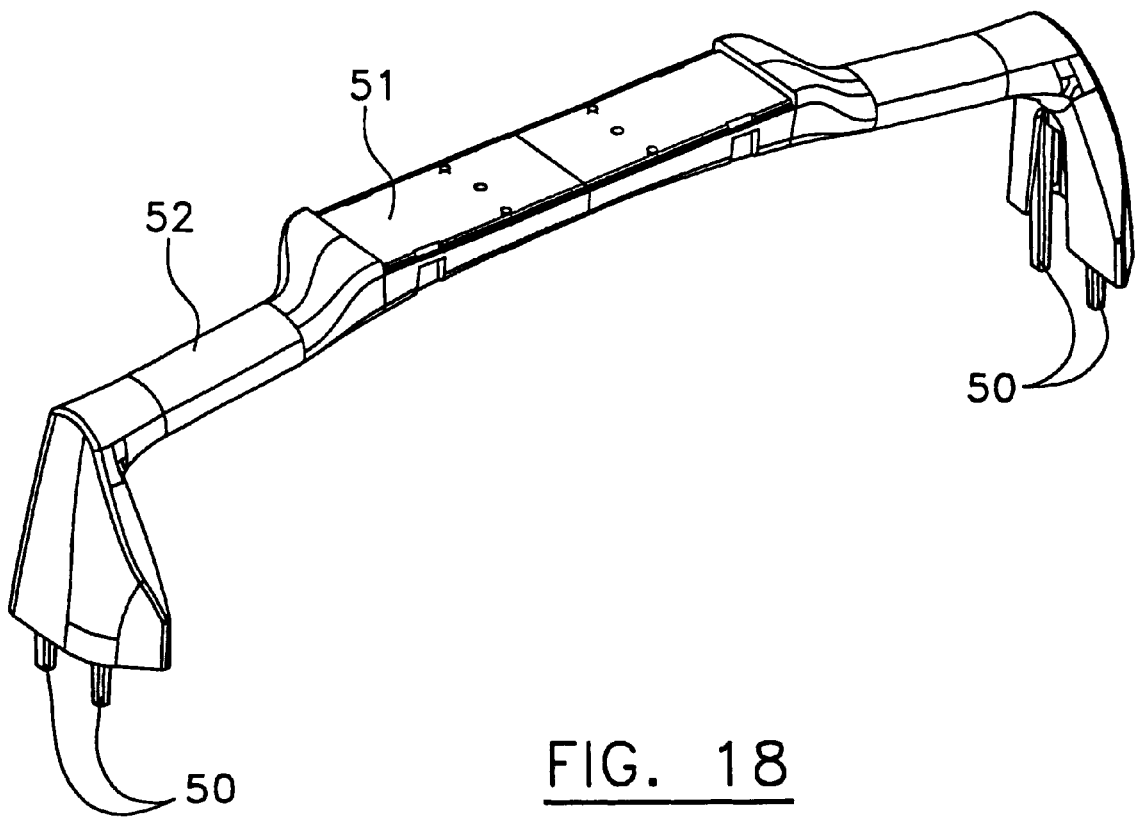
FIG. 18 is a perspective top view of one of the components shown in FIGS. 8 and 9.
Figure 19:
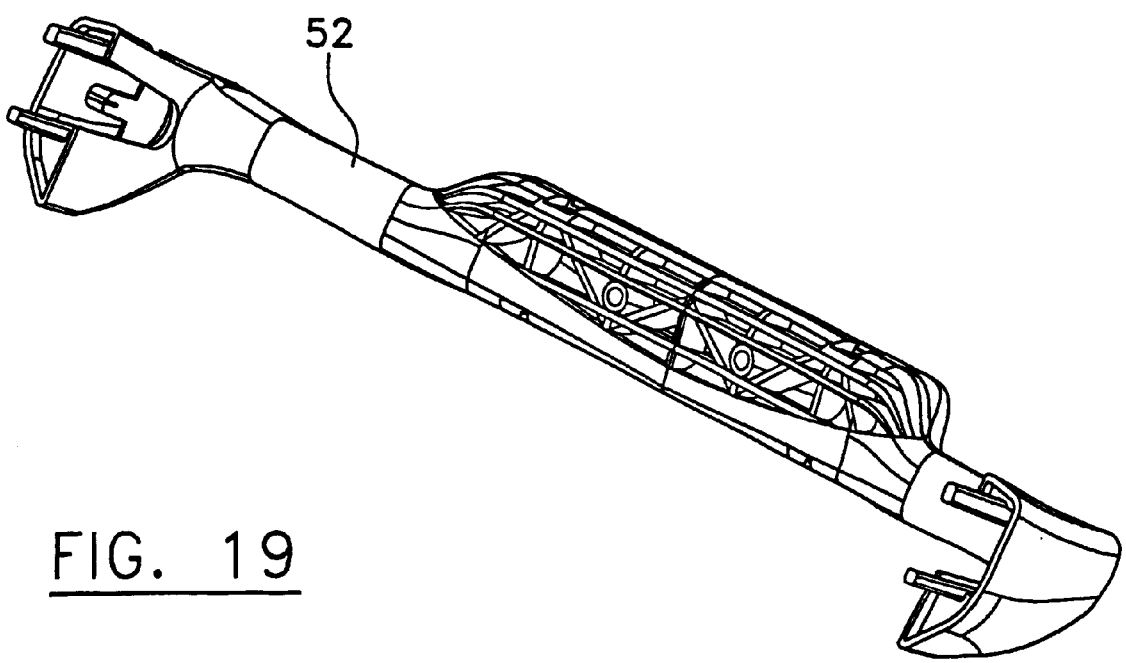
FIG. 19 is a perspective bottom view of the component shown in FIG. 18.

Referring now to FIGS. 18 and 19, there are shown two different perspective views of the handle which illustrate construction details thereof. More specifically, there is shown a surface 51 where a plate with an advertising message can be clipped. This plate will be shown with more details in reference to FIGS. 24 and 25.

Figure 20:
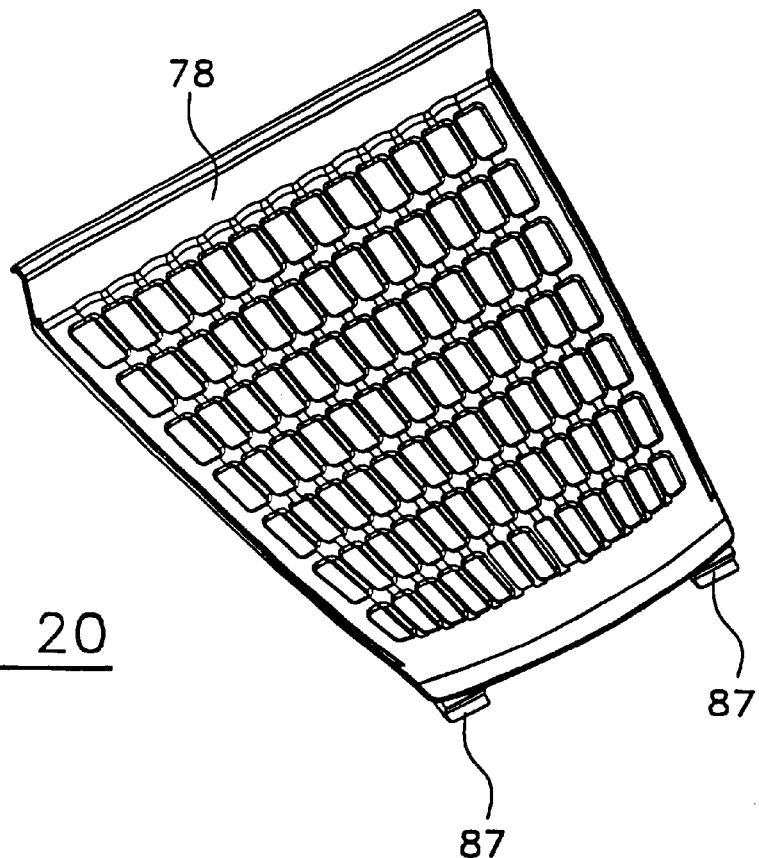
FIG. 20 is a perspective top view of one of the components shown in FIGS. 8 and 9.
Figure 21:
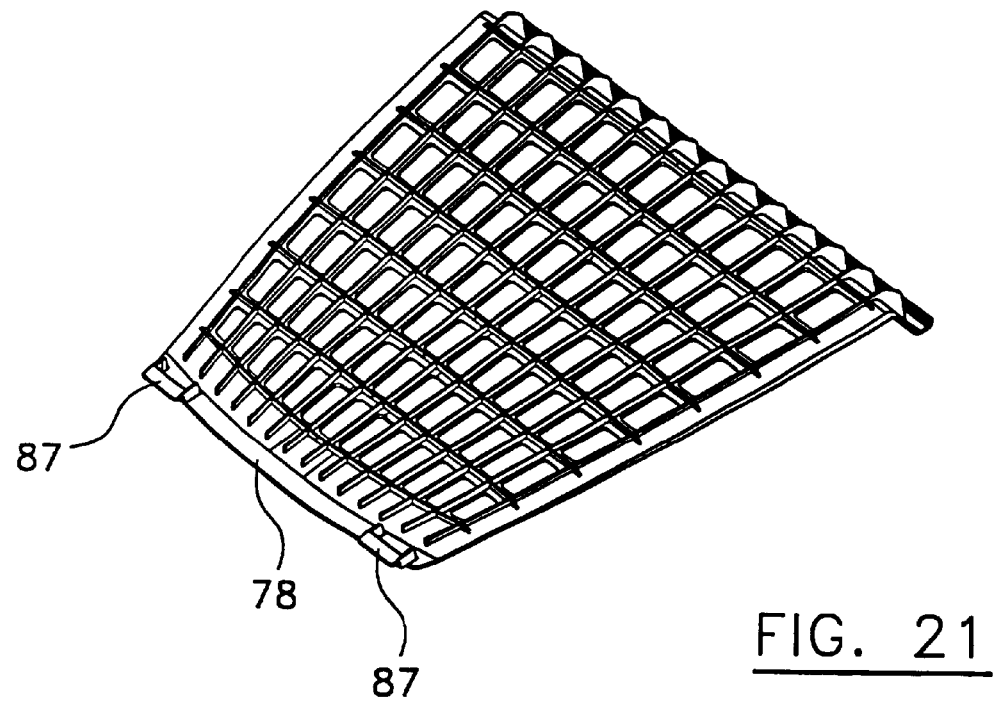
FIG. 21 is a perspective bottom view of the component shown in FIG. 20.

Referring now to FIGS. 20 and 21, there are shown two different perspective views of the horizontal lower support 78 of the base. This horizontal lower support 78 is for placing the more voluminous objects. This support is provided with protruding elements 87 for clipping the support 78 in position on the base.

Figure 22:
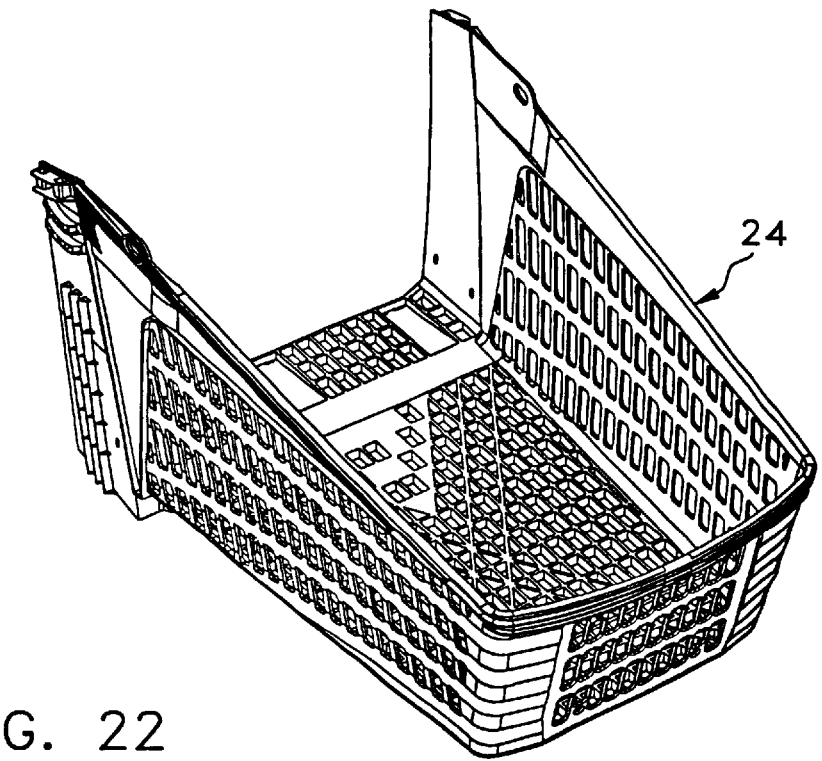
FIG. 22 is a perspective top view of one of the components shown in FIGS. 8 and 9.
Figure 23:
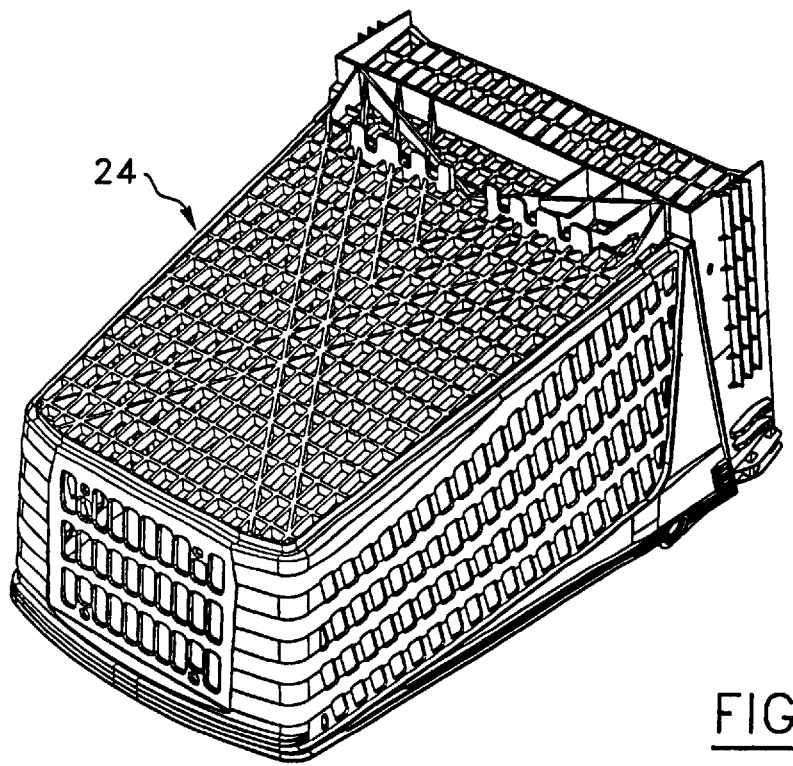
FIG. 23 is a perspective bottom view of the component shown in FIG. 22.

Referring now to FIGS. 22 and 23, there are shown two different perspective views of the basket 24 which illustrate construction details thereof.

Figure 24:
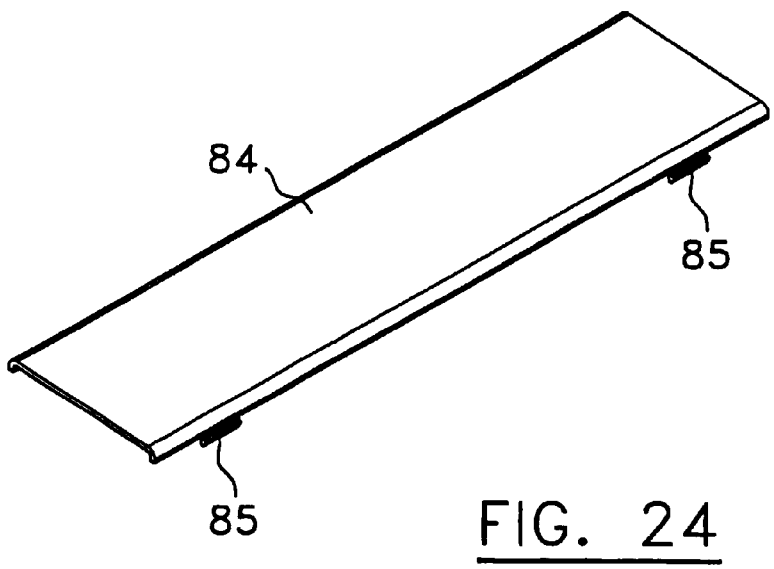
FIG. 24 is a perspective top view of one of the components shown in FIG. 17.
Figure 25:
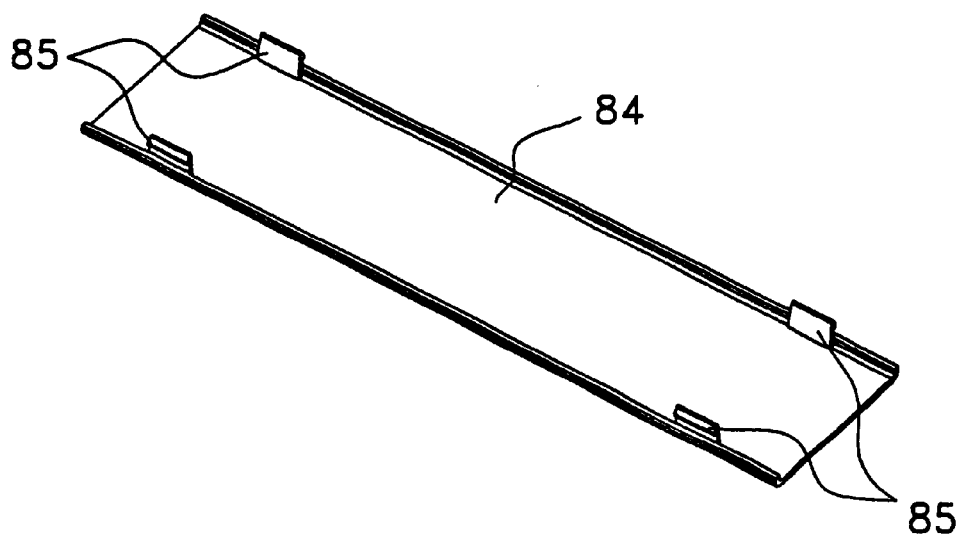
FIG. 25 is a perspective bottom view of the component shown in FIG. 24.

Referring now to FIGS. 24 and 25, there are shown two different perspective views of the transparent plate 84 which is adapted to be mounted on the handle 52 shown in FIGS. 18 and 19. The plate 84 is provided with protruding elements 85 for clipping the plate in position on the handle. The plate 84 covers an advertisement appearing on the handle 52.

Figure 26:
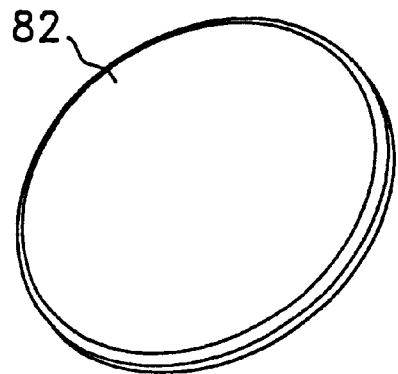
FIG. 26 is a perspective external side view of one of the components shown in FIG. 17.
Figure 27:
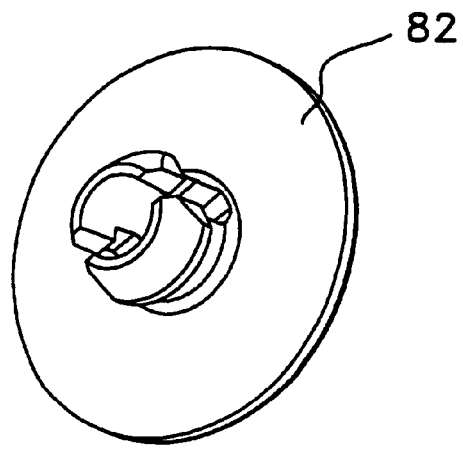
FIG. 27 is a perspective internal side view of the component shown in FIG. 26.

Referring now to FIGS. 26 and 27, there are shown two different perspective views of a button 82 which illustrate details thereof. Buttons 82 are also shown in exploded views 16 and 17. The buttons 82 hide construction details.

Figure 28:
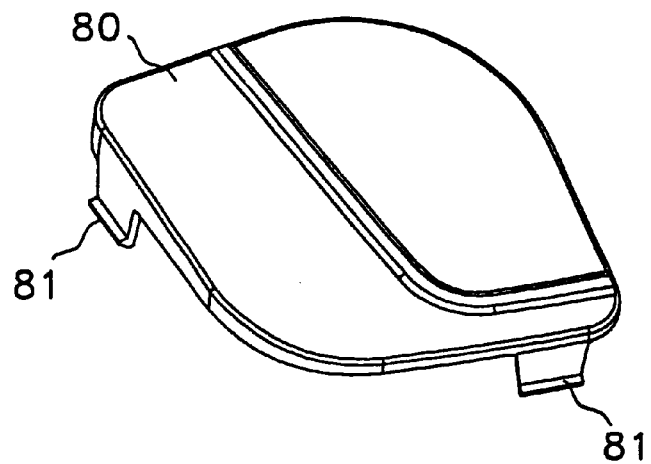
FIG. 28 is a perspective top view of one of the components shown in FIG. 17.
Figure 29:
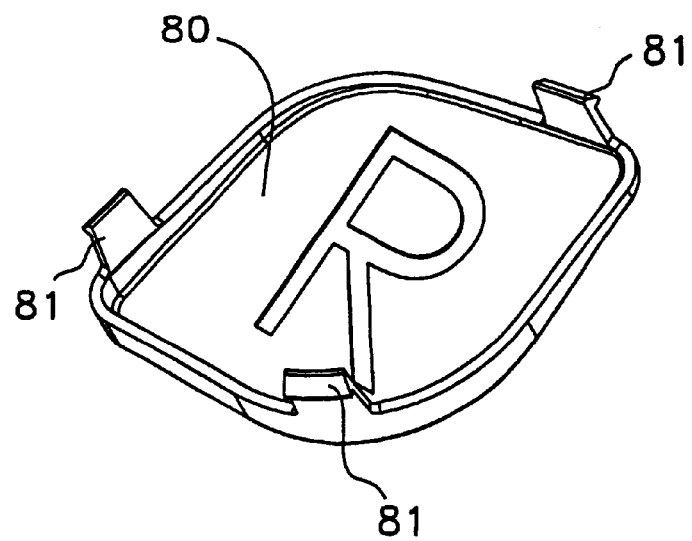
FIG. 29 is a perspective bottom view of the component shown in FIG. 28.

Referring now to FIGS. 28 and 29, there are shown two perspective views of another button 80 which illustrate details thereof. This button 80 is provided with protruding elements 81 for clipping the button in position on the wheeled base as shown in the exploded views 16 and 17. Buttons 80 hide construction details.

Although preferred embodiments of the invention have been described in details therein and illustrated in the accompanying drawings, it is to be understood that the invention is not limited to these precise embodiments and that various changes and modifications may be effected therein without departing from scope or spirit of the invention.

What is claimed is:

1. A modular plastic shopping cart, comprising:
    a wheeled base comprising two opposite vertical side sections each having at least one horizontally projecting member providing a support surface;
    two side uprights removably connectable to the wheeled base, each of the side uprights comprising lower and upper vertical sections, each of the lower vertical sections having at least one horizontally projecting member providing a resting surface, each of the upper vertical sections having at least one horizontally projecting member providing a support surface, the support surfaces of the wheeled base and the resting surfaces of the side uprights having predetermine cooperating shapes to prevent, when assembled, relative pivoting and sliding movement between the side uprights and the wheeled base;
    a basket removably connectable to the side uprights, the basket comprising two opposite vertical side sections each having at least one horizontally projecting member providing a resting surface, the support surfaces of the side uprights and the resting surfaces of the basket having predetermined cooperating shapes to prevent, when assembled, relative pivoting and sliding movement between the basket and the side uprights;
    first securing means for securing the side uprights to the wheeled base; and
    second securing means for securing the basket to the side uprights.

2. A modular plastic shopping cart according to claim 1, wherein the predetermined cooperating shapes of the support surfaces of the side uprights and of the resting surfaces of the basket are shaped like angular bands.

3. A modular plastic shopping cart according to claim 1, wherein the support surfaces of the side uprights and the resting surfaces of the basket form upper and lower groups of interconnectable surfaces.

4. A modular plastic shopping cart according to claim 3, wherein the predetermined cooperating shapes of the support surfaces of the side uprights and of the resting surfaces of the basket are shaped like angular bands.

5. A modular plastic shopping cart according to claim 1, wherein the predetermined cooperating shapes of the resting surfaces of the side uprights and of the support surfaces of the wheeled base are shaped like straight bands extending in parallel and along an axis parallel to a rear-front axis of the cart.

6. A modular plastic shopping cart according to claim 3, wherein:
    the interconnectable surfaces of the upper group comprising:
        upper interconnectable surfaces that are shaped like straight bands extending in parallel and along an upward slope extending from rear to front of the cart; and
        lower interconnectable surfaces that are shaped like curved bands extending in parallel and generally along an axis parallel to a rear-front axis of the cart; and
    the interconnectable surfaces of the lower group are shaped like straight bands extending generally along a vertical direction.

7. A modular plastic shopping cart according to claim 1, wherein the first securing means comprise:
    threaded holes moulded in a lower portion of each of the side uprights; and
    openings moulded in a rear portion of the wheeled base.

8. A modular plastic shopping cart according to claim 1, wherein the second securing means comprise:
    threaded holes moulded in an upper portion of each of the side uprights; and
    openings moulded in a rear portion of the basket.

9. A modular plastic shopping cart according to claim 1, comprising a removable handle having an elongated body terminated by two opposite ends each provided with two parallel prongs extending perpendicularly to the body and having predetermined dimensions for removable connection with holes provided in upper ends of the side uprights.

10. A modular plastic shopping cart according to claim 1, wherein the upper vertical section of each side uprights comprises two horizontally projecting surfaces each provided with a recess, and each of the vertical side section of the basket comprises two horizontally projecting hook surfaces for removable connection with the projecting surfaces of the side uprights.

11. An modular plastic shopping cart according to claim 10, wherein the two horizontally projecting surfaces of the side uprights and the two horizontally projecting hook surfaces of the basket are substantially flat and parallel.

12. A modular plastic shopping cart according to claim 1, wherein the wheeled base comprises a peripheral frame, an horizontal support removably connectable within the peripheral frame, and four wheels removably connectable to the peripheral frame.

13. A modular plastic shopping cart according to claim 9, wherein the removable handle comprises a plate removably connectable to the body of the handle for presenting advertising to a customer driving the shopping cart.

14. A modular plastic shopping cart according to claim 2, comprising a removable handle having an elongated body terminated by two opposite ends each provided with two parallel prongs extending perpendicularly to the body and having predetermined dimensions for removable connection with holes provided in upper ends of the side uprights.

15. A modular plastic shopping cart according to claim 3, comprising a removable handle having an elongated body terminated by two opposite ends each provided with two parallel prongs extending perpendicularly to the body and having predetermined dimensions for removable connection with holes provided in upper ends of the side uprights.

16. A modular plastic shopping cart according to claim 5, comprising a removable handle having an elongated body terminated by two opposite ends each provided with two parallel prongs extending perpendicularly to the body and having predetermined dimensions for removable connection with holes provided in upper ends of the side uprights.

17. A modular plastic shopping cart according to claim 2, wherein the upper vertical section of each side uprights comprises two horizontally projecting surfaces each provided with a recess, and each of the vertical side section of the basket comprises two horizontally projecting hook surfaces for removable connection with the projecting surfaces of the side uprights.

18. A modular plastic shopping cart according to claim 9, wherein the upper vertical section of each side uprights comprises two horizontally projecting surfaces each provided with a recess, and each of the vertical side section of the basket comprises two horizontally projecting hook surfaces for removable connection with the projecting surfaces of the side uprights.

* * * * *